United States Patent [19]

Lawrence et al.

[11] Patent Number: 5,761,386
[45] Date of Patent: Jun. 2, 1998

[54] METHOD AND APPARATUS FOR FOREIGN EXCHANGE RATE TIME SERIES PREDICTION AND CLASSIFICATION

[75] Inventors: Stephen Robert Lawrence, Queensland, Australia; C. Lee Giles, Lawrenceville, N.J.

[73] Assignee: NEC Research Institute, Inc., Princeton, N.J.

[21] Appl. No.: 876,722

[22] Filed: Jun. 16, 1997

Related U.S. Application Data

[63] Continuation of Ser. No. 628,442, Apr. 5, 1996, abandoned.
[51] Int. Cl.$^6$ ..................................................... G06F 15/18
[52] U.S. Cl. ........................... 395/23; 395/22; 705/10; 705/35
[58] Field of Search ............................... 395/11, 22, 23; 705/10, 35

[56] References Cited

U.S. PATENT DOCUMENTS

| | | | |
|---|---|---|---|
| 5,109,475 | 4/1992 | Kosaka et al. | 395/11 |
| 5,121,467 | 6/1992 | Skeirik | 395/11 |
| 5,140,523 | 8/1992 | Frankel et al. | 395/931 |
| 5,247,584 | 9/1993 | Krogmann | 395/11 |
| 5,303,330 | 4/1994 | Gersho et al. | 395/11 |
| 5,398,300 | 3/1995 | Levey | 395/22 |
| 5,402,520 | 3/1995 | Schnitta | 395/22 |
| 5,406,481 | 4/1995 | Shinozawa et al. | 395/931 |
| 5,444,819 | 8/1995 | Negishi | 395/22 |
| 5,455,890 | 10/1995 | Wang | 395/22 |
| 5,461,699 | 10/1995 | Arbabi et al. | 395/23 |
| 5,479,573 | 12/1995 | Keeler et al. | 395/23 |
| 5,490,062 | 2/1996 | Leach et al. | 395/929 |

OTHER PUBLICATIONS

Zeng, "Discrete recurrent neural networks for grammatical inference," IEEE transactions on neural networks, v5, n2, Mar. 1994.

Schmidhuber, "Learning complex, extended sequences using the principle of history compression," Neural computation v4 n2, Dec. 1992.

Aityan, "Stability of a threshold recall control self organizing recurrent neural network," IEEE 1992 Int'l conf. on neural networks v3, Dec. 1992.

Zhang, "A high order temporal neural network for word recognition," ICASSP '95: Acoustics, Speech & Signal processing IEEE v 5, Dec. 1995.

Wang, "Anticipation based temporal pattern generation," IEEE transactions on systems, man and cybernetics, v25 n4, Apr. 1995.

Giles, "Learning, extracting, inserting and verifying grammatical information in recurrent neural networks," IEE colloq.(1993) No. 92: grammatical inference, Dec. 1993.

Fletcher, "Neural networks for learning grammars," IEE colloq. (1993) n92: grammatical inference, Dec. 1993.

Chen, "Constructive learning of recurrent neural networks," Neural networks, IEEE 1993 intl conference, Dec. 1993.

Giles, "Constructive learningn of recurrent neural networks: limitations of recurrent . . . ," IEEE transactions on neural networks, v6 n4, Jul. 1995.

(List continued on next page.)

*Primary Examiner*—Allen R. MacDonald
*Assistant Examiner*—Jeffrey S. Smith
*Attorney, Agent, or Firm*—Jeffery J. Brosemer

[57] ABSTRACT

A method and apparatus for the prediction of time series data, specifically, the prediction of a foreign currency exchange rate. The method disclosed transforms the time series data into a difference of a series, compresses the transformed data using a log transformation, converts the compressed data into symbols, and subsequently trains one or more neural networks on the symbols such that a prediction is generated. Alternative embodiments demonstrate the conversion by a self-organizing map and training by a recurrent neural network.

5 Claims, 6 Drawing Sheets

OTHER PUBLICATIONS

Lawrence, "Can recurrent neural networks learn natural language grammars?," IEE 1996 intl conf on neural network, Feb. 1996.

Giles, "Second order recurrent neural networks for grammatical inference," 1991 IEE intl conf (Seattle), Dec. 1991.

Hoda S Abdel–Aty–Zohdy, "Neural netwokrs for pattern discovery and optimization in signal processing and applications," Electrical and computer engineering 1995 Canadian conf, Dec. 1995.

Giles, "Inserting rules into recurrent neural networks," IEE Neural networks for signal processing II, Dec. 1992.

Tino, "Learning and extracting initial mealy automata with a modular neural network model," Neural computation v7 n4, Dec. 1995.

Moon, "Self organized recurrent neural network for classifying spatio temporal data," IEEE Proceedings of the intl conf. on signal processing applications and technology, Dec. 1994.

Goudreau, "First order versus second order single layer recurrent neural networks," IEEE transactions on neural networks, v5 n3, May 1994.

Schotles, "Unsupervised context learning in natural language processing," Neural Networks, 1991 IEEE intl conf (Seattle), Dec. 1991.

Rao et al., "A Recurrent Neural Network for Nonlinear Time Series Prediction–A Comparative Study," IEEE Neural Networks for Signal Processing II, pp. 531–539, Dec. 1992.

Liszka–Hackzell, "Categorization of Fetal Heart Rate Patterns Using Neural Networks," IEEE Computers in Cardiology, 1994, pp. 97–100, Jul. 1994.

Nie, "A Fuzzy Neural Approach to Time Series Prediction," IEEE Neural Networks, 1994 International Conference, pp. 3164–3169, Dec. 1994.

Azoff, "Neural Network Time Series Forecasting of Financial Markets," pp. 21–90, John Wiley & Sons, Dec. 1994.

McDonnell, "Evolving Recurrent Perceptrons for Time–Series Modeling," IEEE Transactions on Neural Networks, vol. 5 issue 1, pp. 24–38, Jan. 1994.

Refenes et al., "Managing Exchange Rate Prediction Strategies with Neural Networks," Techniques and Applications of Neural Networks, pp. 109–116, Dec. 1993.

Stanley et al., "Predicting the Canadian Spot Exchange Rate with Neural Networks," Proceedings of the IEEE/IAFE Computational Intelligence for Financial Engineering, pp. 108–112, Apr. 1995.

Wurtz et al., "A Neural Decision Support System for Predicting Currency Exchange Rates," Proceedings of the Second International Conference on Artificial Applications on Wall Street, pp. 205–209, Dec. 1993.

Barr et al., "Using Neural Networks to Manage Investments," AI Expert, vol. 9 pp. 16–21, Feb. 1994.

Carson, "Insulin Dosage Adjestment Using Time Series Analysis and Rule Based Reasoning," Proceedings of the 12th Triennial World Congress of the International Federation of Automatic Control, pp. 161–164, Jul. 1993.

Collopy et al., "Rule Based Forecasting: Development and Validation of an Expert Systems Approach to Combininb Time Series Extrapolations," vol. 38 issue 10 pp. 1394–1414, Oct. 1992.

Jean Y. Lequarre, "Foreign Currency Dealing: A Brief Introduction", in Time Series Prediction: Forecasting the Future and Understanding the Past, A.S. Weigend and N.A. Gershenfeld, eds., Addison–Wesley, 1993.

A.S. Weigend, B.A. Huberman, and D.E. Rumelhart, "Predicting Sunspots and Exchange Rates with Connectionist Networks", Nonlinear Modeling and Forecasting, SFI Studies in the Sciences of Complexity Proc., vol. XII, Addison–Wesley, 1992.

H. White, "Economic Prediction Using Neural Networks: The Case of IBM Daily Stock Returns", Proceedings of the IEEE Conference on Neural Networks, pp. 451–458.

C.L. Giles, et al., "Second–Order Recurrent Neural Networks for Grammatical Inference", 1991 IEEE INNS International Conference on Neural Networks IEEE Press, Piscataway, NJ 1992.

Teuvo Kohonen, "The Self–Organizing Map", Proceedings of the IEEE, vol.[7]8,pp.[1]464–1481, in 1980.

C.L. Giles, et al, "Learning and Extracting Finite State Automata with Second–Order Recurrent Neural Networks", Neural Computation, 4(3), pp. 393–495, 1992.

METHOD AND APPARATUS FOR FOREIGN EXCHANGE RATE TIME SERIES PREDICTION AND CLASSIFICATION

This is a continuation of application Ser. No. 08/628,442 filed Apr. 5, 1996, now abandoned.

FIELD OF THE INVENTION

This invention relates generally to the field of time series data prediction, and in particular to a method and apparatus for predicting daily foreign exchange rates.

BACKGROUND OF THE INVENTION

The volume of the foreign exchange market is staggering. In 1989, for example, about 650 billion dollars per day was exchanged. Of the currencies exchanged in the foreign exchange market, the most important are: the US dollar (which acts as a reference currency), the Japanese Yen, the British Pound, the German Mark, and the Swiss Franc. Given the importance and volume of foreign currency exchanged, many financial institutions are trying to predict foreign exchange rates using a variety of proprietary methods. See, for example, Jean Y. Lequarre, "Foreign Currency Dealing: A Brief Introduction", in Time Series Prediction: Forecasting the Future and Understanding the Past", A. S. Weigend and N. A. Gershenfeld, eds., Addison-Wesley, 1993.

Unfortunately, however, foreign exchange rate data exhibit very high noise, and significant non-stationarity thereby minimizing their predictability. Attempts to overcome the high noise inherent in foreign exchange rate data using an overparameterised model and/or techniques such as weight decay or weight elimination to control overfitting have been described by A. S. Weigend, B. A. Huberman, and D. E. Rumelhart in an article entitled "Predicting Sunspots and Exchange Rates with Connectionist Networks", which appeared in Nonlinear Modeling and Forecasting, SFI Studies in the Sciences of Complexity Proc., Vol. XII, Addison-Wesley, 1992, but have met with only limited success.

Neural network technology has been of great interest in recent years, and has recently been applied to the problem of predicting noisy time series data. For example, U.S. Pat. No. 5,444,819 (issued to Michiro Negishi on Aug. 22, 1995, hereinafter referred to as the '819 patent) teaches a system into which time series data are input and moving average values and their differences are generated. As taught by the patentees, a standard neural network is trained on the averages, differences, and a pattern class to predict the value of change.

A method and apparatus for retrieving signals embedded in noise and subsequently analyzing the signals was shown in U.S. Pat. No. 5,402,520 (issued to Bonnie S. Schnitta on Mar 6, 1992 and hereinafter referred to as the '520 patent). The apparatus disclosed in this patent includes an input device for receiving input signals having noise and at least one noise filter retrieves data signals embedded in the input signals.

Despite initial optimism for neural network technology, its effect to date on the prediction of noisy time series data such as foreign currency exchange data has been limited. Consequently, a continued need exists in the art for methods and apparatus which quickly, efficiently, and accurately allow prediction from noisy time series data and in particular, to predict daily foreign exchange rates.

SUMMARY OF THE INVENTION

The above problem is solved and an advance is made over the prior art in accordance with the principles of the invention wherein a prediction is made of a time series of data which oftentimes exhibits significant nonstationarity and noise.

Viewed from one aspect, the invention is directed to an apparatus for predicting time series data. The invention includes: a preprocessing module for transforming the data; a symbolic conversion module which produces a sequence of symbols from the transformed data; and a grammatical inference module which predicts a given quantity from the sequence of symbols. Enhancements to the apparatus include a confidence estimation module which estimates a confidence of the given quantity, a rule extraction module which extracts one or more rules, and a rule interpretation module which produces predictions using the extracted rules.

Viewed from another aspect, the invention is directed to a method for predicting time series data. The method disclosed transforms the time series data into a difference of a series, compresses the transformed data using a log transformation, converts the compressed data into symbols, and subsequently trains one or more neural networks on the symbols such that a prediction is generated. Alternative embodiments demonstrate the conversion by a self-organizing map and training by a recurrent neural network.

Other advantages and features will become apparent from the following drawings, detailed description, and claims.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

A preferred embodiment of the invention will now be described while referring to the figures, several of which may be simultaneously referred to during the course of the following description. Before thoroughly describing the method and apparatus which is the subject of the present invention, however, a discussion of the theoretical background is helpful.

Particularly, the efficient market hypothesis (EMH) has found broad acceptance in the financial community and in its weak form, asserts that the price of an asset reflects all of the information that can be obtained from past prices of the asset, i.e., the movement of the price is unpredictable. See, for example, H. White, "Economic Prediction Using Neural Networks: The Case of IBM Daily Stock Returns," in the proceedings of the IEEE Conference on Neural Networks, pages 451–458.

The best prediction of a price is the current price when the actual price follows what is generally called a random walk.

One argument in support of the EMH is that if any profit opportunities appear, they will be exploited immediately by traders, and thereby disappear. Conversely, arguments against the EMH include the fact that not all information reaches all traders simultaneously, and that traders with more sophisticated methods may be able to make better use of the available information.

Assuming the validity of the EMH, then a financial series can be modeled as the addition of a noise component at each step:

$$x(k+1)=x(k)+\epsilon(k), \quad (1)$$

where $\epsilon(k)$ is a zero mean Gaussian variable with variance $\sigma$ and $x(k)$ is the value of the time series at step k. The best estimation is:

$$\hat{x}(k+1)=x(k) \quad (2)$$

In other words, if the series is truly a random walk, then the best estimate for the next time period is equal to the current estimate. Now, if it is assumed that there is a predictable component to the series, then:

$$x(k+1)=x(k)+f(x(k),x(k-1),\ldots,x(k-n+1))+\epsilon(k) \quad (3)$$

may be used where $\epsilon(k)$ is a zero mean Gaussian variable with variance $\sigma$, and $f(\cdot)$ is a nonlinear function in its arguments. In this case, the best estimate is given by $$\hat{x}(k+1)=x(k)+f(x(k),x(k-1),\ldots,x(k-n+1)) \quad (4)$$

Figure 1:
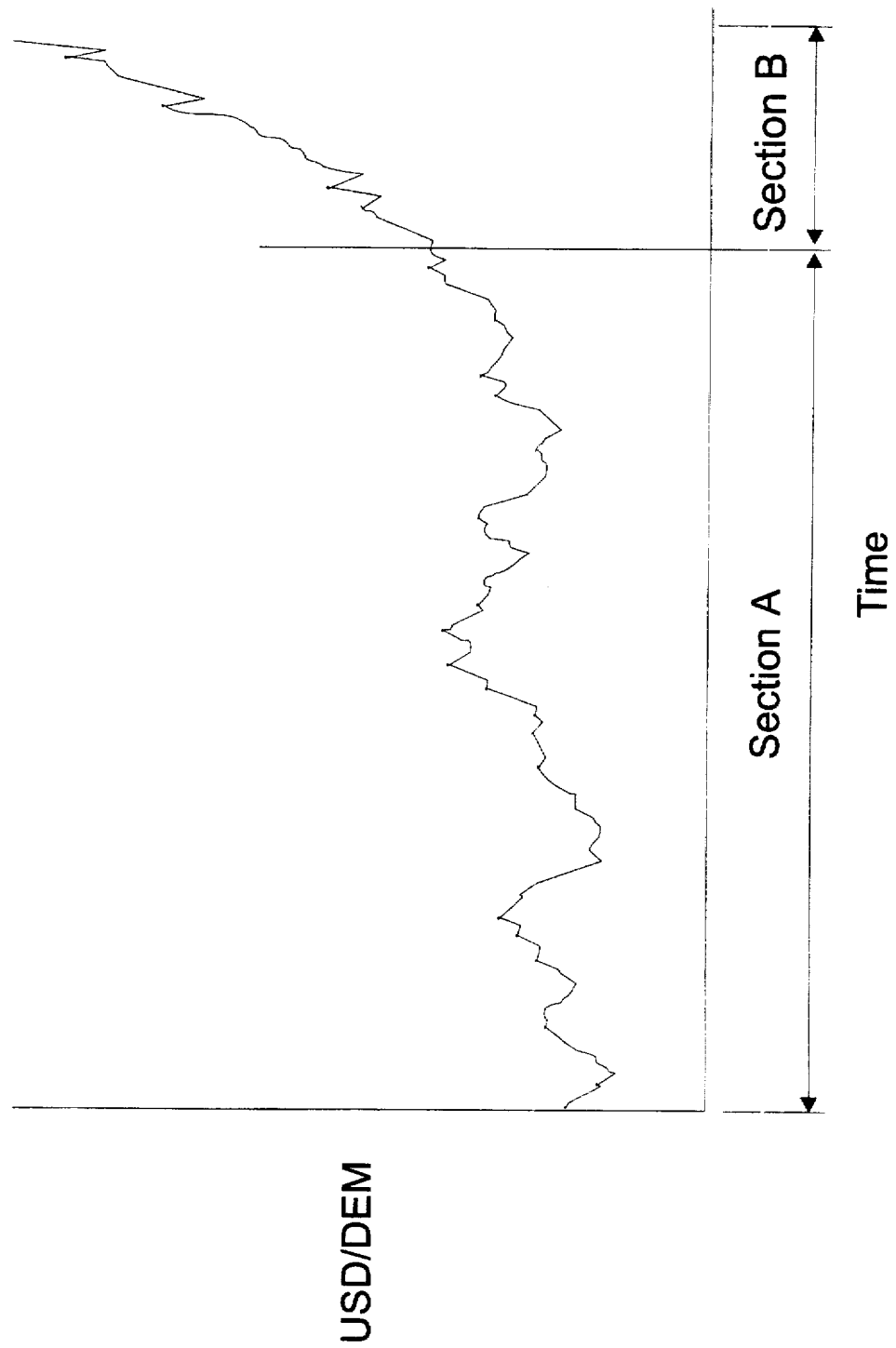
FIG. 1 is a graph of exemplary time-series data.

Attempts at prediction using this model are problematic as the series often contains a trend. For example, and with reference to FIG. 1, a neural network trained on section A has no chance of generalizing to the test data in section B, because the model was not trained with data in this range. Those skilled in the art can readily appreciate that neural networks are good at interpolation, and not extrapolation.

A common solution to this is to use the model $$\delta(k+1)=f(\delta(k),\delta(k-1),\ldots,\delta(k-n+1))+v(k), \quad (5)$$

where $$\delta(k+1) \triangleq x(k+1)-x(k) \quad (6)$$

and $v(k)$ is a zero mean Gaussian variable with variance $\sigma$. In this case, the best estimate is $$\hat{\delta}(k+1)=f(\delta(k),\delta(k-1),\ldots,\delta(k-n+1)). \quad (7)$$

Note that the first order differences are being used instead of the raw time series.

Figure 2:
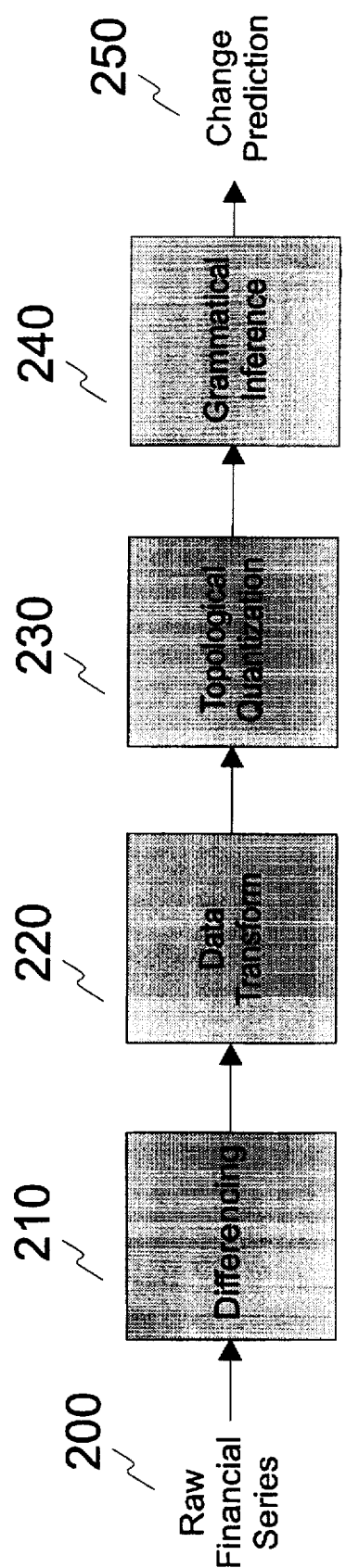
FIG. 2 is a flow chart showing the processing of time-series data according to the teachings of the present invention.

With reference to FIG. 2, there is shown a block diagram of the system which is the subject of the present invention. Specifically, raw financial series 200 are received by differencing block 210, whose output is processed at log compression block 220 which compresses the dynamic range of the series and reduces the effect of any outlying data. Next, quantization/symbolic encoding is performed at block 230, and grammatical inference (see, for example, C. L. Giles et al, "Second-Order Recurrent Neural Networks for Grammatical Inference," 1991 IEEE INNS International Conference on Neural Networks, IEEE Press, Piscataway, N.J., 1992) at block 240 which results in change prediction output 250.

The above process starts with a set of raw time series values $y(k)$, $k=1, 2, \ldots, N$, and $y(k) \in S$. These values denote the daily closing prices of a particular financial time series, however, they could be any time series. Next, the first difference of the series, $y(k)$, is taken as follows:

$$\delta(k)=y(k)-y(k-1), \quad (8)$$

which results in $\delta(k)$, $\delta(k) \in S$, $k=1, 2, \ldots, N-1$.

In order to compress the dynamic range of the series and reduce the effect of outliers, a log transformation of the data is used, namely:

$$x(k)=\text{sign}(\delta(k))(\log(|\delta(k)|+1)), \quad (9)$$

which results in $x(k)$, $k=1, 2, \ldots, N-1$, $x(k) \in S$. However, for some time series this is not necessary. Other compression methods may be used for other time series.

Next, a delay embedding of this series is considered, $$X(k,d_1)=(x(k),x(k-1),x(k-2),\ldots,x(k-d_1+1)), \quad (10)$$

where $d_1$ is the delay embedding dimension and $X(k,d_1)$ is a state vector.

This delay embedding forms the input to a self-organizing map (SOM). Consequently, the SOM input is the last $d_1$ values of the log transformed delta time series. The output of the SOM is a topographical location of the winning node, where each node represents one symbol in the resulting grammatical inference problem.

As used in the present invention, the SOM can be represented by the equation $$S(k)=g(X(k,d)), \quad (11)$$

where $S(k) \in [0, 1, 2, \ldots, n_s-1]$, $n_s$ is the number of symbols (nodes) for the SOM. By way of convenience, each node in the SOM is assigned an integer index ranging from 0 to the number of nodes minus 1.

Next, an Elman recurrent neural network is trained on the sequence of outputs from the SOM. Those skilled in the art can readily appreciate that many recurrent networks may be used. For the recurrent network:

$$O(k+1)=C^T z_k+c_0 \quad (12)$$

and $$z_k=F_{n_h}(A z_{k-1}+B u_k+b), \quad (13)$$

where C is a $n_h \times n_o$ vector representing the weights from the hidden layer to the output nodes, $n_h$ is the number of hidden nodes, $n_o$ is the number of output nodes, $c_0$ is a scalar, and $z_k$, $z_k \in S^{n_h}$ is an $n_h \times 1$ vector which denotes the outputs of the hidden layer neurons.

Additionally, $u_k$ is a $d_2 \times 1$ vector, where $d_2$ is the embedding dimension used for the the input window of symbols that is presented to the SOM. As such, $u_k$ may be represented by:

$$u_k = \begin{bmatrix} S(k) \\ S(k-1) \\ S(k-2) \\ \ldots \\ S(k-d_2+1) \end{bmatrix} \quad (14)$$

and A and B are matrices of appropriate dimensions which represent the feedback weights from the hidden nodes to the hidden nodes and the weights from the input layer to the hidden layer respectively. Similarly, $F_{n_h}$ is a $n_h \times 1$ vector containing the sigmoid functions, b is a $n_h \times 1$ vector that denotes the bias of each hidden layer neuron, $O(k)$ is a $n_o \times 1$ vector containing the outputs of the network, and $n_o$ is 2.

Consequently, $$O(k+1)=F_1(\delta(k),\delta(k-1),\delta(k-2),\delta(k-3),\delta(k-4)) \quad (15)$$

or $$O(k+1)=F_2(y(k),y(k-1),y(k-2),y(k-3),y(k-4),y(k-5)). \quad (16)$$

As an example of how the recurrent neural network could be trained, the net could have two outputs whereby the first output is trained to predict the probability of a positive change in the series, and the second output is trained to predict the probability of a negative change.

The self-organizing map (SOM), described by Teuvo Kohonen in an article entitled "The Self-Organizing Map," which appeared in Proceedings of the IEEE, vol. 78, pp. 1464–1480, in 1980, is an unsupervised learning process which learns a distribution of a set of patterns without any class information. In particular, a pattern is projected from a possibly high dimensional input space $\mathcal{D}$ to a position in the map, a low dimensional display space $\mathcal{D}$. Oftentimes, the display space $\mathcal{D}$ is divided into a grid having a number of intersections wherein each intersection is represented in the network by a neuron. Information is encoded as the location of an activated neuron. The SOM, unlike most classification or clustering techniques, preserves the topological ordering of classes in the input space $\mathcal{D}$ in the resulting display space $\mathcal{D}$. Similarity as measured using a metric in the input space $\mathcal{D}$, is preserved in the display space $\mathcal{D}$.

Figure 3:
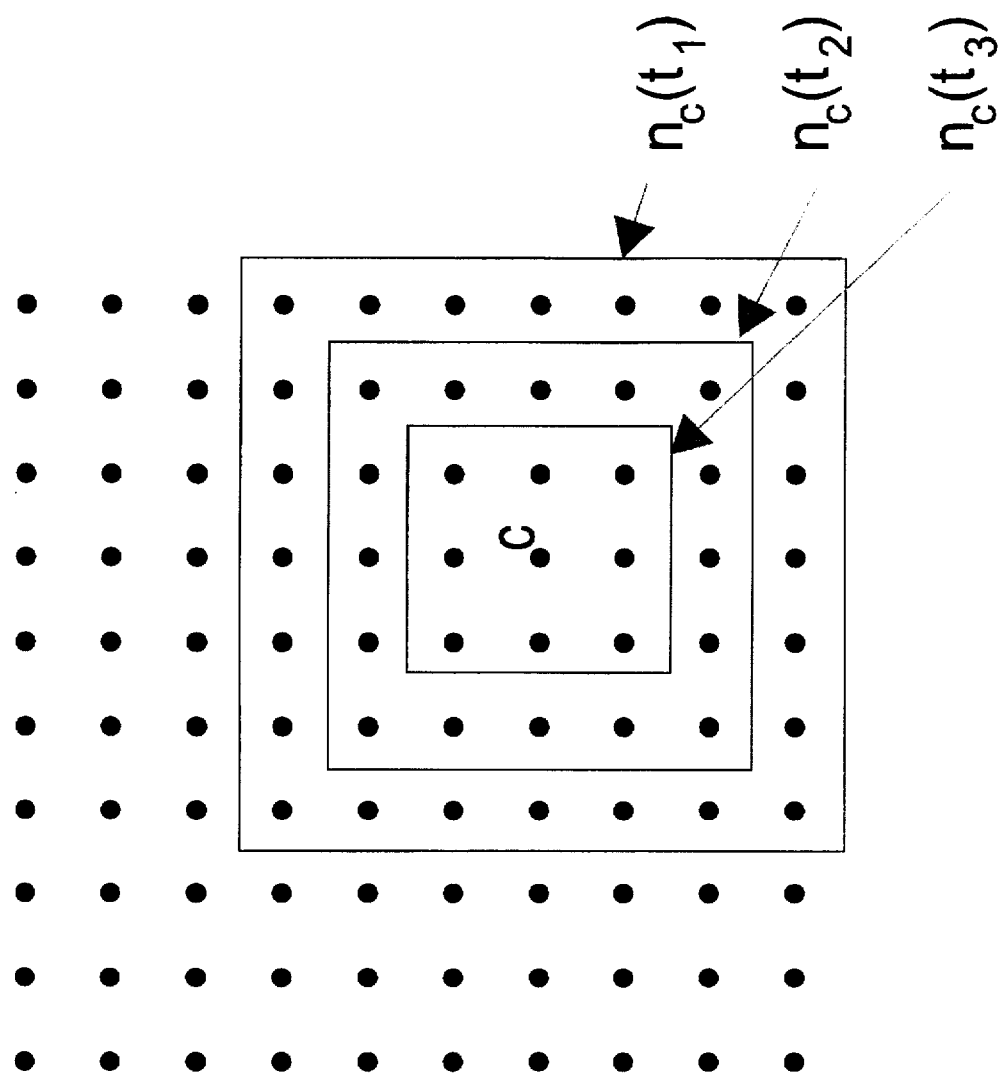
FIG. 3 is an illustration of a self-organizing map.

In operation, the SOM defines a mapping from an input space $S^n$ onto a topologically ordered set of nodes, usually in a lower dimensional space $\mathcal{D}$. An example of such a two-dimensional SOM is shown in FIG. 3. A reference vector, $m_i \equiv [\mu_{i1}, \mu_{i2}, \ldots, \mu_{in}]^T \in S^n$, is assigned to each node in the SOM.

During training, each input x is compared to all the $m_i$ obtaining the location of the closest match according to a particular metric. The input point is mapped to this location in the SOM.

Nodes in the SOM are updated according to the metric and their position in relation to the winning node. For example, nodes may be updated according to:

$$m_i(t+1)=m_i(t)+h_{ci}(t)[x(t)-m_i(t)], \quad (17)$$

where t is the time during learning and $h_{ci}(t)$ is the neighborhood function, a smoothing kernel which is maximum at $m_c$. Usually, $h_{ci}(t)=h(\|r_c-r_i\|,t)$, where $r_c$ and $r_i$ represent the locations of nodes in the SOM output space $\mathcal{D}$. $r_c$ is the node with the closest weight vector to the input sample and $r_i$ ranges over all nodes. $h_{ci}(t)$ approaches 0 as $\|r_c-r_i\|$ increases and also as t approaches $\infty$. A widely applied neighborhood function is:

$$h_{ci} = \alpha(t)\exp\left(-\frac{\|r_c - r_i\|^2}{2\sigma^2(t)}\right), \quad (18)$$

where $\alpha(t)$ is a scalar valued learning rate and $\sigma(t)$ defines the width of the kernel. Those skilled in the art can readily appreciate that a SOM can be viewed as a non-linear projection of the probability density, p(x), of the input patterns x.

As described, the nodes in the display space $\mathcal{D}$ encode the information contained in the input space $S^n$. Since there are M nodes in $\mathcal{D}$, this implies that the input pattern vectors $x \in S^n$ are transformed to a set of M symbols, while preserving their original topological ordering in $S^n$. Thus, if the original input patterns are highly noisy, the quantization into the set of M symbols while preserving the original topological ordering can be understood as a form of filtering. The amount of filtering is controlled by M. If M is large, this implies there is little reduction in the noise content of the resulting symbols. On the other hand, if M is small, this implies that there is a "heavy" filtering effect, resulting in only a small number of symbols.

Figure 4:
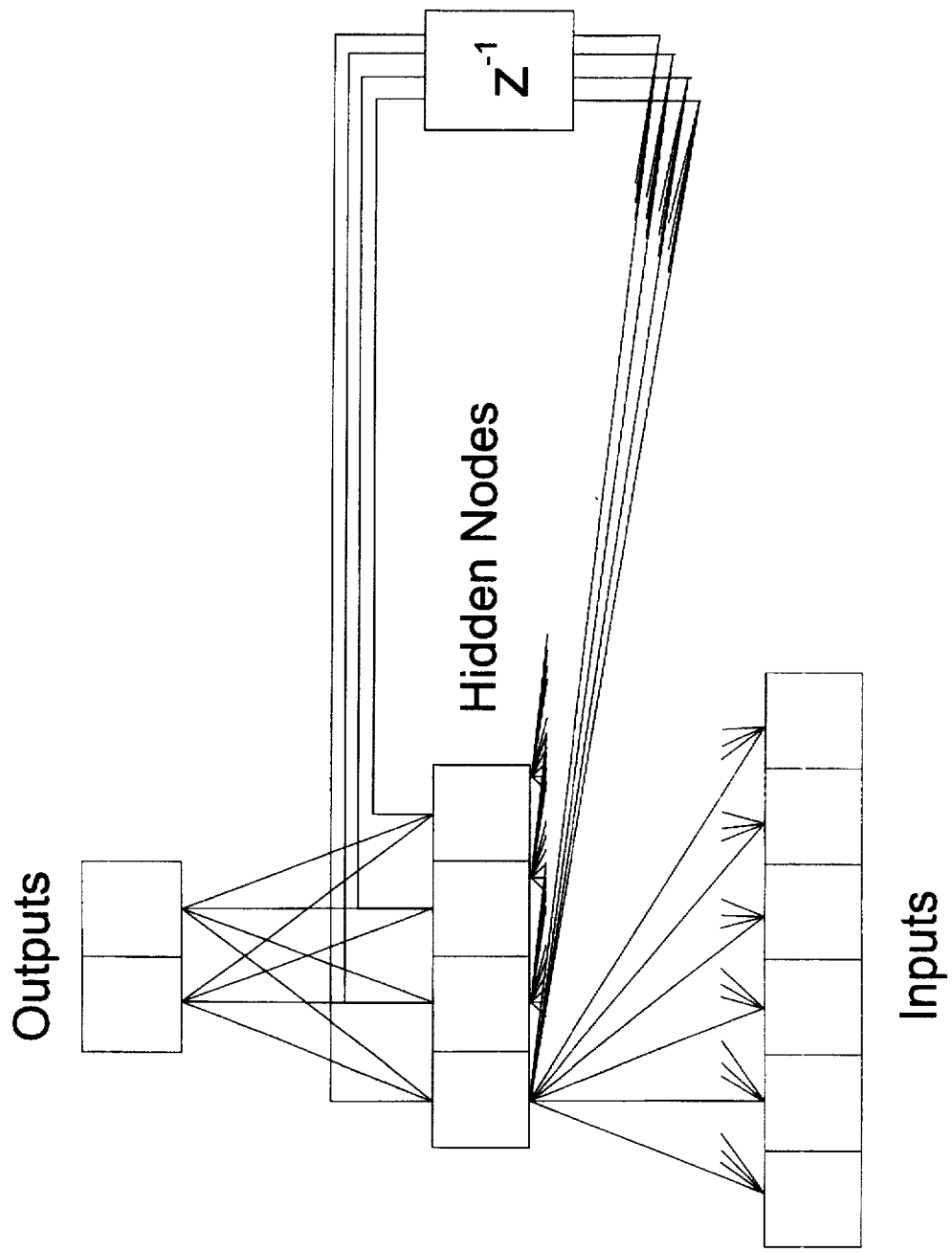
FIG. 4 is an illustration of an Ellman neural network.

With reference now to FIG. 4, one example of a recurrent neural network which could be used for grammatical inference in the present invention is the Elman neural network. As is shown in FIG. 4, the Elman neural network has feedback from each of the hidden nodes to all of the hidden nodes. The set of M symbols from the output of the SOM are discretely encoded in a linear fashion into a single input for the recurrent neural network (e.g. if M=3, the single input is either −1, 0, or 1). Those skilled in the art will readily recognize that linear encoding is justified by the topographical order of the symbols. In order to facilitate the training of the recurrent network, an input window of is used, i.e. a number of the most recent symbols are presented to separate input neurons of the recurrent neural network.

According to the teachings of the present invention, non-stationarity of the signal is advantageously overcome by building models based on a short time period only. Specifically, models are trained using a certain number of data points. Separate models may be trained for prediction at various times.

The extraction of symbolic knowledge greatly aids the interpretability of the solution. The ordered triple of a discrete Markov process ({state; input→next-state}) can be extracted from a recurrent neural network and used to form an equivalent deterministic finite state automata (DFA). While this extraction can be done by clustering the activation values of the recurrent state neurons, automata extracted using this process can only recognize regular grammars. Note that as used herein, a regular grammar G is a 4-tuple G={S, N, T, P} where S is the start symbol, N and T are non-terminal and terminal symbols, respectively, and P represents productions of the form A→a or A→aB where A, B $\in$ N and $\alpha \in$ T.

A method which can be used for automata extraction in the present invention is the same as described C. L. Giles, et. al., in an article entitled "Learning and Extracting Finite State Automata with Second-Order Recurrent Neural Networks", which appeared in Neural Computation, 4(3), pp. 393–495, 1992. However, other extraction methods can be used and are known in the art.

Figure 5:
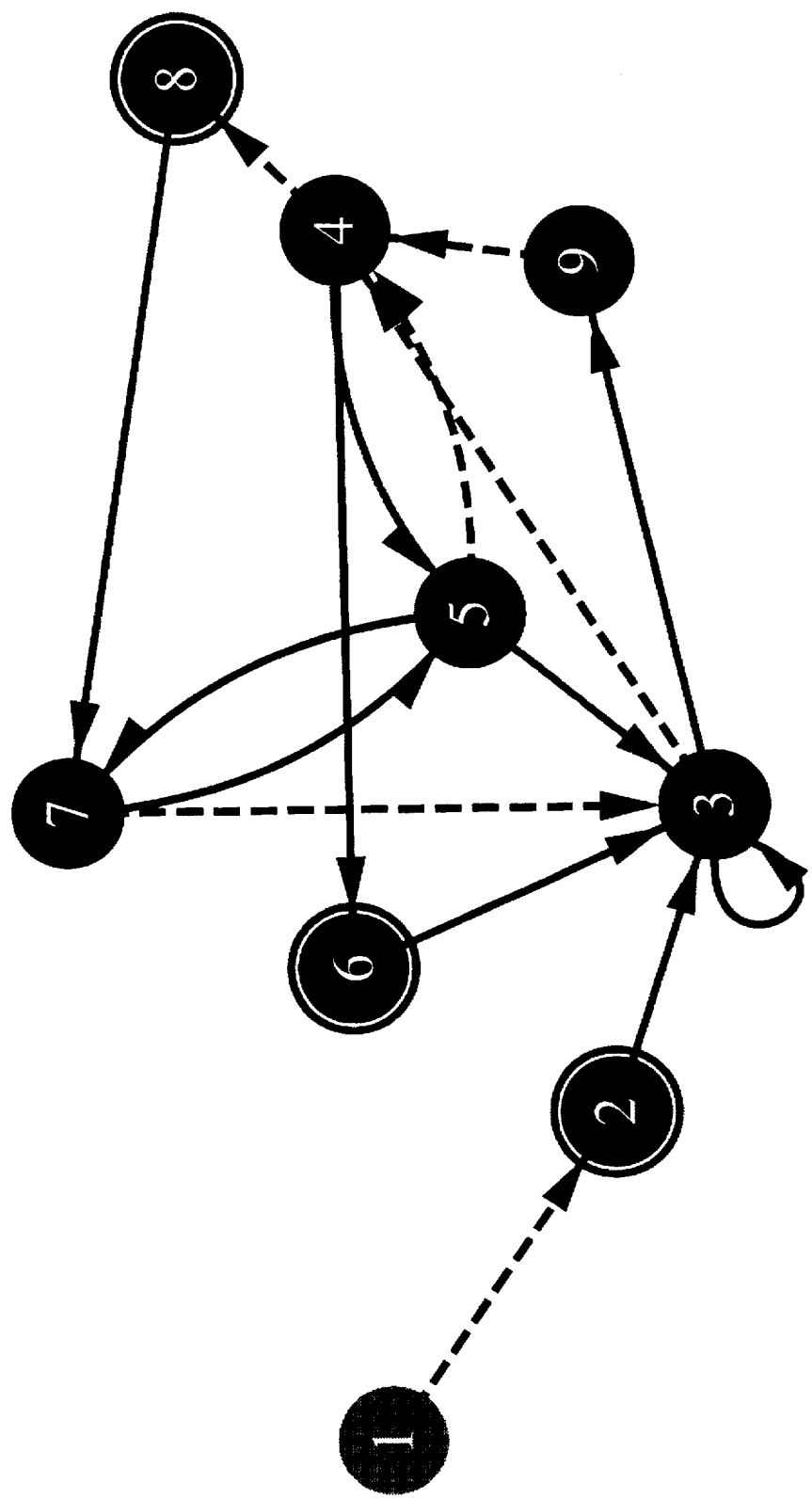
FIG. 5 is an illustration of a sample extracted automata.

A sample extracted automata for the British Pound is shown in FIG. 5. The DFA has been minimized using minimization techniques known in the art.

Summarizing the DFA extraction method, the state $z_k$ is first divided into q cells, i.e., $z_{ki}$, i=1, 2, . . . , $n_h$ is divided into q segments. Hence the total number of quantized states is $q^{n_h}$. By running the inputs $u_k$, k=1, 2, . . . , N through the network, the corresponding set of activations $z_k$, k=1, 2, . . . , N can be obtained. These activations are often clustered in the activation space and quantize to the same value.

For a given input sequence, the path through the DFA may be followed. For the example given in FIG. 5, $$\begin{bmatrix} n_2 \\ n_3 \\ n_4 \\ n_5 \\ n_6 \\ n_7 \\ n_8 \\ n_9 \end{bmatrix}_{k+1} = \begin{bmatrix} 0 & 0 & 0 & 0 & 0 & 0 & 0 & 0 \\ S_3 & S_2 & 0 & S_3 & S_2 & S_1 & 0 & 0 \\ 0 & S_1 & 0 & 0 & 0 & 0 & 0 & S_1 \\ 0 & 0 & S_3 & 0 & 0 & S_2 & 0 & 0 \\ 0 & 0 & S_2 & 0 & 0 & 0 & 0 & 0 \\ 0 & 0 & 0 & S_2 & 0 & 0 & S_3 & 0 \\ 0 & 0 & S_1 & 0 & 0 & 0 & 0 & 0 \\ 0 & S_3 & 0 & 0 & 0 & 0 & 0 & 0 \end{bmatrix} \begin{bmatrix} n_2 \\ n_3 \\ n_4 \\ n_5 \\ n_6 \\ n_7 \\ n_8 \\ n_9 \end{bmatrix}_k + \begin{bmatrix} S_1 \\ 0 \\ 0 \\ 0 \\ 0 \\ 0 \\ 0 \\ 0 \end{bmatrix} (n_1)_k \quad (19)$$

and the output is given by $$\begin{bmatrix} +\text{ve change} \\ -\text{ve change} \end{bmatrix}_k = \begin{bmatrix} n_2 \oplus n_6 \oplus n_8 \\ n_3 \oplus n_4 \oplus n_5 \oplus n_7 \oplus n_9 \end{bmatrix} \quad (20)$$

where $S_i$, i=0, 1, 2 are the output symbols from the SOM. (In FIG. 12 $S_1$ is the dotted line, $S_2$ is the gray line, and $S_3$, is the solid line). $n_i$, i=1, 2, . . . , 9 are the nodes in the minimized DFA.

The DFA nodes, $n_i$, i=1, 2, . . . , 9 are not related to any physical entities. Nevertheless, the extracted DFA may be linked back to the original time series as follows:

1. Transforming the SOM input data sequence, $X(k, d_1)$, into the SOM output symbols, giving, $\mathcal{R} \rightarrow \mathcal{D}$ ; and
2. Following the path of these symbols through the DFA and determining if the current state corresponds to a positive or negative change.

Hence, for a given sequence of financial data, the transitions in the DFA may be determined.

Figure 6:
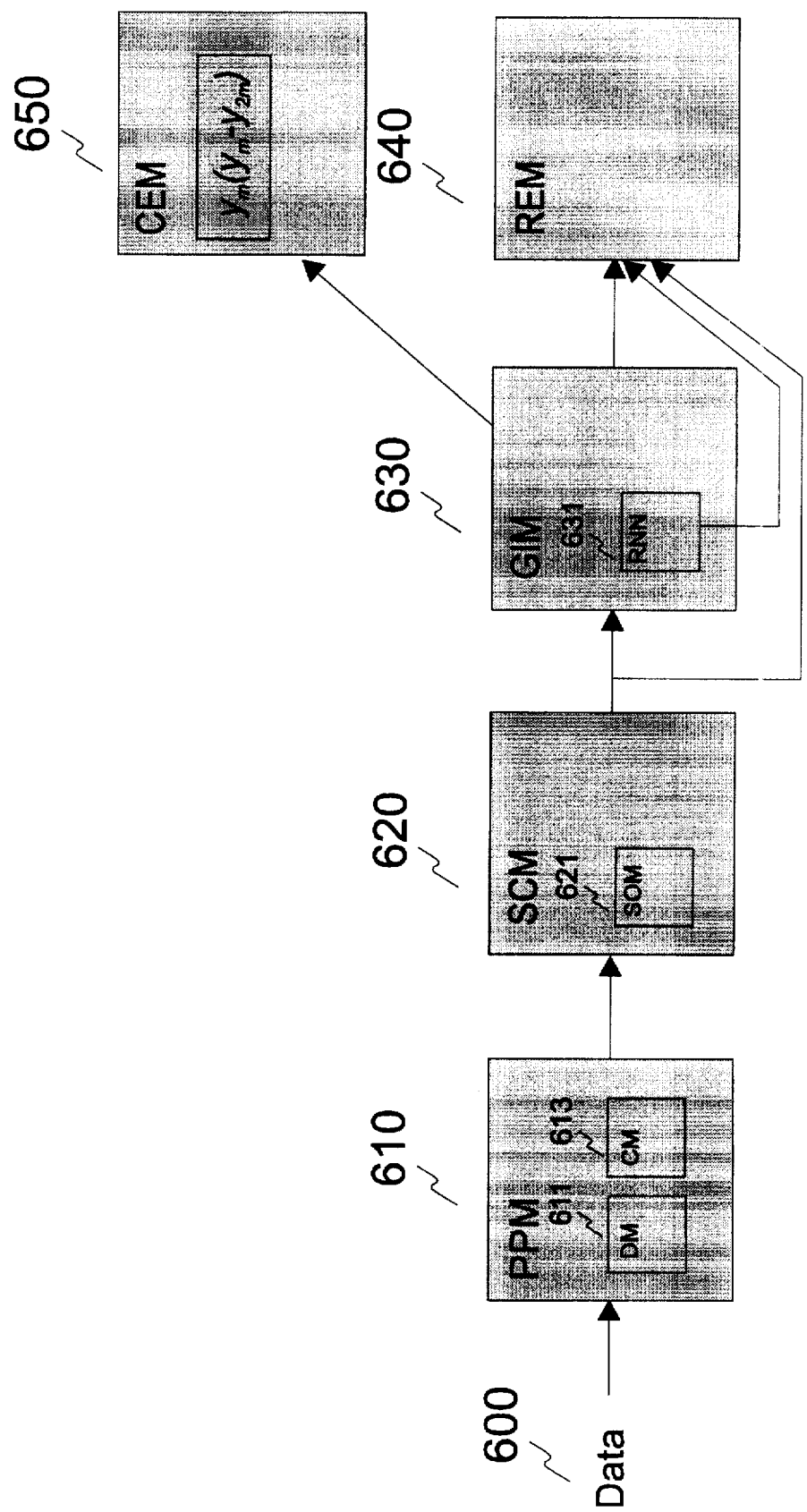
FIG. 6 is a block diagram of a system for predicting time-series data according to the teachings of the present invention.

A block diagram of one embodiment is shown in FIG. 6. Specifically, time series data 600 is received by pre-processing module 610, which transforms the input data. In a preferred embodiment, the pre-processing module may contain differencing module 611 which reduces any nonstationarity of the data, and compression module 613, which generates a log compression of the data.

Symbolic conversion module 620 which preferrably is performed with self-organizing map 621, produces a sequence of symbols from the transformed data. Grammatical inference module 630, having one or more recurrent neural networks 631 or employing other grammatical inference methods, predicts a given quantity from the sequence of symbols.

Alternatively, the prediction system may include confidence estimation module 650 which estimates a confidence of the given quantity using any of a variety of metrics.

Rule interpretation module 640, advantageously produces predictions using the extracted rules.

It should now be quite evident to those skilled in the art, that while the invention was shown and described in detail in the context of a preferred embodiment, and with various modifications thereto, a wide variety of other modifications can be made without departing from the scope of our inventive teachings.

What is claimed is:

1. A system for predicting foreign exchange rate time series data comprising:

a means for preprocessing which receives the foreign exchange rate time series data and then transforms the foreign exchange rate data;

a means for symbolic conversion that produces a sequence of symbols from the transformed foreign exchange rate data, wherein said symbolic conversion means includes a self-organizing map neural network having a plurality of nodes, wherein each one of said nodes is an independent symbol and each one of said symbols is encoded according to a topological ordering of the nodes in the self organizing map;

a means for grammatical inference which predicts a given foreign exchange rate from the sequence of symbols produced by the self-organizing map neural network, wherein said grammatical inference means includes an Elman recurrent neural network having an input layer, an output layer and a hidden layer, each layer comprising one or more nodes, each node in the input layer being connected to each node in the hidden layer and each node in the hidden layer being connected to each node in the output layer as well as each node in the hidden layer such that said predicted foreign exchange rate is dependent upon both the sequence of symbols and a current state of said recurrent neural network;

a means for rule extraction which extracts, using an extraction method, one or more production rules from the grammatical inference means regarding the prediction of the given foreign exchange rate; and a means for confidence estimation which estimates a confidence of the given foreign exchange rate wherein the confidence estimation means generates the confidence estimate of the prediction of the foreign exchange rate using outputs of the grammatical inference means according to $y_m(y_m-y_{2m})$ where $y_m$ is a maximum and $y_{2m}$ is a second maximum output of the recurrent neural network;

wherein the given foreign exchange rate predicted by the grammatical inference means, the production rules extracted by the rule extraction means and the confidence estimate of the foreign exchange rate estimated by the confidence estimation means are continuously generated and dependent upon a respective input and a current state of the recurrent neural network.

2. The prediction system according to claim 1 further comprising:

a means for rule interpretation which interprets the extracted rules.

3. The prediction system according to claim 1 wherein said foreign exchange rate data is nonstationary and said preprocessing module further comprises:

a means for differencing which reduces the nonstationarity of the foreign exchange rate data.

4. The prediction system according to claim 1 wherein said preprocessing module further comprises:

a means for compressing which produces a log compression of the foreign exchange rate data.

5. The prediction system according to claim 1 wherein said rule extraction means further comprises:

a means for quantizing which quantizes a state space of hidden nodes contained in the grammatical inference means such that a deterministic finite state automata corresponding to training data is obtained.

* * * * *